United States Patent [19]

Bidare

[11] Patent Number: 5,394,505
[45] Date of Patent: Feb. 28, 1995

[54] THERMAL JET GLASS CUTTER

[75] Inventor: Srinivas R. Bidare, Ann Arbor, Mich.

[73] Assignee: Aeromover Systems Corporation, Dexter, Mich.

[21] Appl. No.: 996,030

[22] Filed: Dec. 23, 1992

[51] Int. Cl.6 .......................... C03B 33/02; F24H 3/00
[52] U.S. Cl. ................................. 392/379; 392/382; 392/473; 156/497; 225/93.5
[58] Field of Search .................. 392/379, 382–385, 392/473–477; 156/497; 225/93.5

[56] References Cited

U.S. PATENT DOCUMENTS

| | | | |
|---|---|---|---|
| 1,991,734 | 2/1935 | Eaton | 392/379 |
| 3,324,625 | 6/1967 | Dulmage | 392/379 X |
| 3,422,247 | 1/1969 | Royston et al. | 392/379 X |
| 3,453,097 | 7/1969 | Hafiver | 225/93.5 X |
| 3,635,454 | 1/1972 | Angelo et al. | 392/473 |

FOREIGN PATENT DOCUMENTS

| | | | |
|---|---|---|---|
| 63-278669 | 11/1988 | Japan | 392/379 |
| 2-41771 | 2/1990 | Japan | 392/379 |
| 250103 | 3/1928 | Switzerland | 392/473 |
| 1357116 | 6/1974 | United Kingdom | 392/379 |
| 1024288 | 6/1983 | U.S.S.R. | 156/497 |

*Primary Examiner*—Mark H. Paschall
*Attorney, Agent, or Firm*—Harness, Dickey & Pierce

[57] ABSTRACT

This invention relates to a device for causing fracture of a brittle material such as a glass. The invention employs at least two fluid streams directed against the surface of the material to be cut. One stream is a heated fluid such as air whereas a second flow of colder fluid such as ambient temperature air is also directed against the surface to be fractured at a displaced location. The combined effect of heating and rapid cooling causes thermal stress and fracture to occur in the material to be cut. The manner of applying the fluid according to this invention produces a highly controllable propagating fracture.

10 Claims, 1 Drawing Sheet

THERMAL JET GLASS CUTTER

BACKGROUND

This invention relates to the cutting of glass, using a cold fluid jet to produce a controlled thermal shock to induce a precisely propagated fracture of the glass. While not limited thereto in its capability, the present invention is an effective tool for severing glass and similar material in curved patterns and odd shapes as well as linear cuts without leaving serrated, or ragged edges.

In U.S. Pat. No. 1,720,883 F. N. Campbell, et al disclose a method of severing glass along a defined line by applying heat to the zone of such line and other conditions in a manner whereby controlled expansion takes place and the glass is accurately severed at the desired line. The heat necessary for the invention is provided in a controlled method from a table and support system which separates the glass and pieces derived from the cutting process. The prior art is limited in its flexibility; that is, the pattern in which the glass is to be cut must be pre-determined and then the mechanism, or table must be reset each time a change in the cutting pattern is desired. The prior art utilizes bare copper wire laid within notches on the cutting table to provide heat for the cutting process, therefore, this method is further inflexible because its mode of thermal transference must also be prepatterned.

In U.S. Pat. No. 3,839,006 Pikor discloses an apparatus for cutting notch sensitive materials. The apparatus induces heat shock to notch sensitive materials, including glass. This apparatus includes a flexible resistance heater wire which may be applied to an article to be severed in overlying relationship to the desired fracture plane; the fracture plane usually being defined by a preconditioning step of scribing. The prior art is inflexible in its ability to transfer the necessary heat for the process because the mode of tranference is a copper wire, patterns of severence are limited to shapes which can be overlayed by the wire. Pikor's is also inflexible in that the glass must be scribed along the desired cut before the mode of heat transfer is applied to sever the glass.

In United Kingdom patent number 1,357,116 Pilkington Brothers Limited disclose an invention which relates to the cutting of glass and in particular to the cutting of glass sheet material by inducing thermal stress within the glass. The apparatus provides a method of cutting glass sheet material which method comprises forming a point of weakness at a position on the glass, directing a stream of heated gas through a nozzle outlet towards the glass so that the stream is incident on the point of weakness to initiate a fracture in the glass, meanwhile restraining the flow of heated gas away from the area of glass adjacent the nozzle outlet by means of a restraining member symmetrically disposed around the nozzle outlet and extending perpendicular to the axis of the nozzle outlet, and effecting relative movement between the glass and the nozzle outlet along a path, the temperature and flow rate of the gas being controlled so that sufficient stress is generated in the glass to extend the fracture from the point of weakness along the path in a controlled fashion.

In summary, prior art claims to generate a fracture by heating the glass by direct contact with a heated wire, heating of the glass by bringing the glass in close proximity to a heating wire, or, by heating the glass with a jet of hot gas. While heating the glass by any of the above methods will result in a fracture of the glass, precise control of the fracture line is difficult to achieve because the fracture actually occurs as the glass cools. Thus, the prior art relies on precision heating of the glass along the desired fracture line and depends upon ambient atmospheric air to cool the glass back to the the line of fracture. At best, this is a random cooling process, particularly where the heating and cooling is not in a linear pattern. The prior art is limited, as cited in United Kingdom patent number 1,357,116, Pilkington Brothers Limited, in that small circles are impossible to cut in their entirety by the hot gas jet method of heating. The final few degrees cannot be cut by the hot gas method if the ambient atmospheric air is used for cooling, because the final few degrees will fracture uncontrollably in an undesireable fashion in a chord to the circle, therefore, use of mechanical means is required to complete the cut. This undesireable effect is caused by the retention of heat in the glass in the center of circle which is subjected to constant application of heat; the retained heat cannot be disipated quickly enough by ambient atmospheric air. However, if the exact track of the cooling gradient can be controlled, a precise, and controlled fracture can be achieved. The prior art attempts to control the fracture line by surrounding the hot air jet with a ring to control lateral dispersion of the hot air and consequently disipation of heat through the glass. The exact line of fracture is dependant upon the rate of cooling from the outside of the heated area to center of the area which was heated. The present invention directs the cooling air to cause a fracture in any desired pattern and provides a finished edge that requires no additional grinding, or cutting.

SUMMARY OF THE INVENTION

The present invention is a device to cut glass by thermal fracture with positive control of both the speed and direction of the fracture. Components of the device regulate both overall temperature of the process as well as both the rate of heating and cooling of the material to be severed, the cooling portion being the most critical part of the process. The precise control of the line of fracture is generated by directing the cooling jet along the desired preheated line of fracture.

A preferred embodiment of the thermal jet glass cutter is comprised of a heating element that has been enclosed in a container made of a highly heat-resistant material. A pressurized fluid source provides ambient temperature fluid which is forced through the heating element causing said fluid to be heated. The heated fluid is then directed through a nozzle onto the glass surface. A sensor in the heating equipment regulates the temperature of said outgoing heated fluid. A hot fluid baffle partially encloses a small area around the nozzle to direct the flow of said hot fluid in the direction of travel, and prevents mixing of hot and cool fluid jets.

BRIEF DESCRIPTION OF THE DRAWING

These and other features, aspects and advantages of the present invention will become better understood with reference to the following description, appended claims, and accompanying drawings where

DETAILED DESCRIPTION OF THE DRAWING

Figure 1:
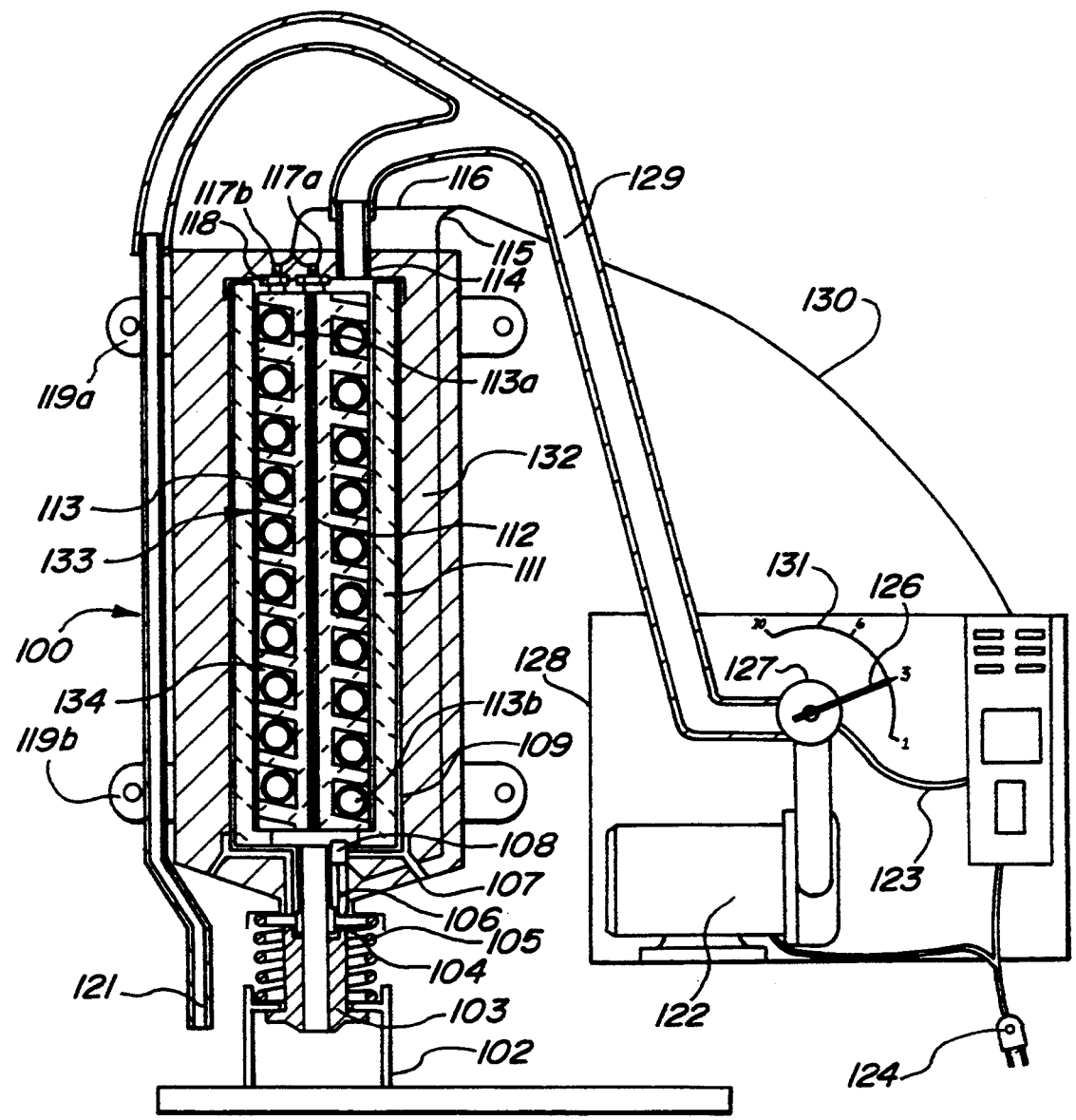
FIG. 1 is a sectional view of a preferred embodiment of the thermal jet glass cutter.

The present invention is a thermal jet glass cutter having a thermal shock device and a control module. With reference to the drawings particularly FIG. 1, the instant invention has a control module 128, a thermal shock device 100. Said thermal shock device is connected to said control module by means of a fluid hose 129 and device control wires 130. The thermal shock device 100 moves along a contour on the material to be cut 101.

The control module 128 has a fluid pump 122 to provide fluid to the thermal shock device 100, and an electronic circuit board 125 that controls the temperature of a heating element 113 in the thermal shock device 100. A flow control valve 127 controls the fluid flow into the fluid hose 129. A selector knob 126 actuates the flow control valve 127 based on its position on a dial gauge 131. A feedback wire 123 serves as a control input from the selector knob 126 to the electronic circuit board 125. A power input cord 124 provides power to the heating element 113 and the fluid pump 122.

The thermal shock device 100, has a hot fluid baffle 102 to direct the flow of hot fluid in the direction of travel, and to prohibit mixing of the hot and cool fluid jets. Said 103 nozzle is attached to an outlet tube 104. The outlet tube 103 is rigidly connected to an inner sleeve 109. In the preferred embodiment, said nozzle is attached to said outlet tube using screw threads for easy disengagement. Said hot fluid baffle is also calibrated to measure clearance between said thermal shock device and said material to be cut using an indicator 120.

The heating element 113 is a continuous helix starting at 113a and ending at 113b. A heat-resistant helical inner core 112 supports the heating element 113. Said helical inner core is encased in a heat-resistant cylinder 111. The heating element is positioned in a helical channel 134 through which air passes while it is heated. The electrical circuit of the heating element 113 terminates at terminal posts 117a and 117b. The device control wires 130 containing a temperature sensor wires 115 and power wires 116, connects the thermal shock device 100 and the electronic circuit board 125. Said sensor wires are connected to a temperature sensor 108.

The inner sleeve 109 is supported by a spacer 106. Said inner sleeve is rigidly attached to an inlet tube 114. Said spacer also insulates the outlet tube 104. Said inner sleeve is encased in a thermal shock device housing 107. The preferred embodiment of said thermal shock device housing has mounting tabs 119a and 119b and 110a and 110b. The space between said inner sleeve and said thermal shock device housing is filled by an insulating material 132. A heating core assembly 133 comprising the inner sleeve 109, the helical heating element 113, the helical inner core 112 and the heat-resistant cylinder 111. A tensioning spring 105 urges the hot fluid baffle 102 from the thermal shock device housing 107 and thus forces the hot fluid baffle 102 into engagement against the material to be cut 101.

A cold fluid jet tube 121 is attached to the thermal shock device housing 107 using mounting tabs 119a and 119b. In the preferred embodiment, the inlet tube 114 and the cold fluid jet tube 121 are connected to the control module 128 by means of the fluid hose 129. The thermal shock device 100 can be conveniently attached to mounting devices and/or mechanisms using mounting tabs 119a, 119b, 110a and 110b.

Figure 2:
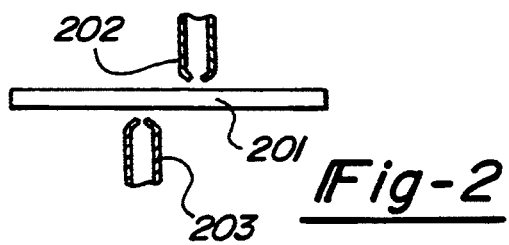
FIG. 2 is a sectional view of another preferred embodiment wherein the cooling jet is positioned on the opposing plane of the glass, as may be desired when cutting thick material.

The selector knob 126 is set by the operator according to the thickness of the material to be cut. The fluid pump 122 delivers the fluid which is regulated by the flow control valve 127. The fluid flows from said flow control valve through the fluid hose 129 into the inlet tube 114. The fluid flows into the heat-resistant helical inner core 112 and flows concentric to the heating element 113 to the outlet tube 104. As the fluid flows through the heat-resistant helical inner core 112, it is heated to a high temperature. The fluid flows out through the nozzle 103 and strikes the material to be cut 101. The process of heating said material to be cut prepares said material to be cut for the cold fluid jet flowing from the cold fluid jet tube 121. With reference to FIG. 2, this configuration places the hot fluid nozzle 202 above the glass 201 with the cold fluid nozzle 203 on the opposite plane of the glass. The remainder of the thermal shock device 101 remains the same as in FIG. 1 indicated by the arrow in FIG. 1.

What is claimed is:

1. A device for cutting a material by inducing thermal stress along a desired line of fracture comprising:
   heating means for producing a heated fluid,
   first nozzle means for applying a stream of said heated fluid against said material,
   a source of an unheated fluid having a temperature less than said heated fluid,
   second nozzle means for applying a stream of said unheated fluid against said material, and
   housing means for positioning said first and second nozzle means relative to said material such that as said housing means is moved relative to said material, said material is first heated by the application of said heated fluid and thereafter cooled by the application of said unheated fluid to produce said desired line of fracture.

2. The device according to claim 1 wherein said heating means comprises an electrical resistance heater for transferring heat to said heated fluid.

3. The device according to claim 1 wherein said heated fluid is air.

4. The device according to claim 1 wherein said unheated fluid is air.

5. The device according to claim 1 wherein said air unheated fluid is at ambient temperature.

6. The device according to claim 1 wherein said material is glass.

7. The device according to claim 1 further comprising means for separating the flow of said heated and unheated fluids as they are directed against said material.

8. The device according to claim 7 wherein said means for separating comprises a baffle generally surrounding said first nozzle means.

9. The device according to claim 8 further comprising spring means for urging said baffle into contact with said material.

10. The device according to claim 7 wherein said material has a plate configuration with opposed first and second face surfaces and said means for separating comprises positioning said first nozzle means to apply said heated fluid on said first face surface of said material and positioning said second nozzle means to apply said unheated fluid on said second face surface of said material.

* * * * *